(12) United States Patent
Roberts

(10) Patent No.: US 8,065,363 B2
(45) Date of Patent: *Nov. 22, 2011

(54) ELECTRONIC MAIL COMMUNICATIONS SYSTEM WITH CLIENT EMAIL INTERNET SERVICE PROVIDER (ISP) POLLING APPLICATION AND RELATED METHODS

(75) Inventor: Aaron Roberts, Monroe, WA (US)

(73) Assignee: Research In Motion Research Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,464

(22) Filed: Sep. 24, 2010

(65) Prior Publication Data

US 2011/0016176 A1    Jan. 20, 2011

Related U.S. Application Data

(63) Continuation of application No. 11/426,668, filed on Jun. 27, 2006, now Pat. No. 7,805,489.

(51) Int. Cl.
  *G06F 15/16* (2006.01)
(52) U.S. Cl. ........................ 709/203; 709/206
(58) Field of Classification Search .................. 709/203, 709/206
  See application file for complete search history.

(56) References Cited

U.S. PATENT DOCUMENTS

| | | | |
|---|---|---|---|
| 6,366,950 B1 | 4/2002 | Scheussler et al. | 709/206 |
| 6,775,687 B1 | 8/2004 | Binding et al. | 709/203 |
| 7,801,959 B1 * | 9/2010 | Lennie et al. | 709/206 |
| 2002/0120697 A1 | 8/2002 | Generous et al. | 709/206 |
| 2002/0143866 A1 | 10/2002 | Lewis et al. | 709/203 |
| 2002/0147836 A1 * | 10/2002 | Flanagin | 709/238 |
| 2003/0026231 A1 | 2/2003 | Lazaridis et al. | 370/338 |
| 2004/0186891 A1 | 9/2004 | Panec et al. | 709/206 |
| 2005/0039048 A1 | 2/2005 | Tosey | 713/201 |
| 2005/0164703 A1 | 7/2005 | Huynh | 455/432.3 |
| 2005/0169285 A1 | 8/2005 | Wills et al. | 370/401 |

(Continued)

FOREIGN PATENT DOCUMENTS

WO    2004/017583    2/2004

OTHER PUBLICATIONS

"Technical White Paper BlackBerry Enterprise Server, for Microsoft Exchange, Version 2.1", Research in Motion Limited, Canada, 2002, pp. 1-18.

(Continued)

*Primary Examiner* — John Follansbee
*Assistant Examiner* — Imad Hussain
(74) *Attorney, Agent, or Firm* — Allen, Dyer, Doppelt, Milbrath & Gilchrist, P.A.

(57) ABSTRACT

An electronic mail (email) communications system may include a mobile wireless communications device, a wireless communications network connected to the Internet, and an Internet Service Provider (ISP) server connected to the Internet for receiving emails for a given user. The system may further include an email proxy server connected to the Internet for pushing emails from the ISP server to the mobile wireless communications device via the wireless communications network. A user computer may be connected to the Internet and may include a client email application for periodically polling the ISP server to detect new emails. The client email application may also send new email notifications to the email proxy server upon detection of new emails to cause the email proxy server to push the new emails to the mobile wireless communications device.

23 Claims, 10 Drawing Sheets

U.S. PATENT DOCUMENTS

| | | | |
|---|---|---|---|
| 2006/0036702 A1 | 2/2006 | Theimer | 709/207 |
| 2007/0073813 A1* | 3/2007 | Kamat et al. | 709/206 |
| 2007/0073815 A1* | 3/2007 | Kamat et al. | 709/206 |
| 2007/0088790 A1 | 4/2007 | Shenfield et al. | 709/206 |
| 2007/0106739 A1* | 5/2007 | Clark et al. | 709/206 |
| 2007/0156817 A1* | 7/2007 | Daffner et al. | 709/206 |
| 2007/0214226 A1* | 9/2007 | Song et al. | 709/206 |
| 2008/0270547 A1* | 10/2008 | Glickstien et al. | 709/206 |
| 2010/0250681 A1* | 9/2010 | Van Wely | 709/206 |

OTHER PUBLICATIONS

BlackBerry Internet Service Version 2.0 Feature and Technical Overview; XP-002428620; Research in Motion Limited, Mar. 2006, pp. 3, 7, 8.

SMSmail-POP3 Email Notification to Mobile Phone via SMS free download, available at www.freedownloadscenter.com.

SMS4Mail filter and pop3 email account and send SMS notification, SMS4Mail and Ping Alert, available at 222.sms4mail.com.

* cited by examiner

ELECTRONIC MAIL COMMUNICATIONS SYSTEM WITH CLIENT EMAIL INTERNET SERVICE PROVIDER (ISP) POLLING APPLICATION AND RELATED METHODS

RELATED APPLICATION

This application is a continuation of Ser. No. 11/426,668 filed Jun. 27, 2006, now U.S. Pat. No. 7,805,489 the entire disclosure of which is hereby incorporated herein by reference.

FIELD OF THE INVENTION

The present invention relates to the field of communications systems, and, more particularly, to wireless electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails stored in source mailboxes of different email storage servers (e.g., corporate email storage server, Yahoo, Hotmail, AOL, etc.).

One approach for delivering emails to a user's mobile wireless communications device is to use an email proxy server to retrieve new emails from an email storage server(s) (e.g., an ISP server) associated with the user's email account, and then forward the emails to the user's wireless handheld device. One challenge of doing so is knowing when to check the email storage server for new messages. Typically, this is done periodically because the email proxy server will not otherwise know when a new message arrives. Yet, if the period of polling is too short, this may place a significant burden on the email proxy server, particularly if it has to check multiple email servers for numerous users.

Another approach to forwarding emails to wireless handheld devices is provided by a client application called SMS4Mail. This program checks and filters email accounts and sends Short Message Service (SMS) messages to a user's mobile phone. The program can handle up to twenty POP3 e-mail accounts, and it may also send the SMS messages to multiple mobile phones at the same time. Various criteria may be used for filtering incoming e-mails to be sent to the mobile phone, such as From and Subject fields. Users also have the option to limit the maximum number of SMS messages for one day. Moreover, an SMS message is only to be sent once for each email which meets the specified filtering criteria.

While such systems may be advantageous for notifying users on their mobile phone when new messages are available, SMS messages are limited to a relatively small number of characters, so while a user will receive an indication of a new email, if the email is fairly long the user will only be able to see the very first part of the message. Moreover, many wireless network (i.e., cellular) carriers charge for each SMS message, which may make such an approach undesirably expensive for some users.

DETAILED DESCRIPTION OF THE PREFERRED EMBODIMENTS

Figure 1:
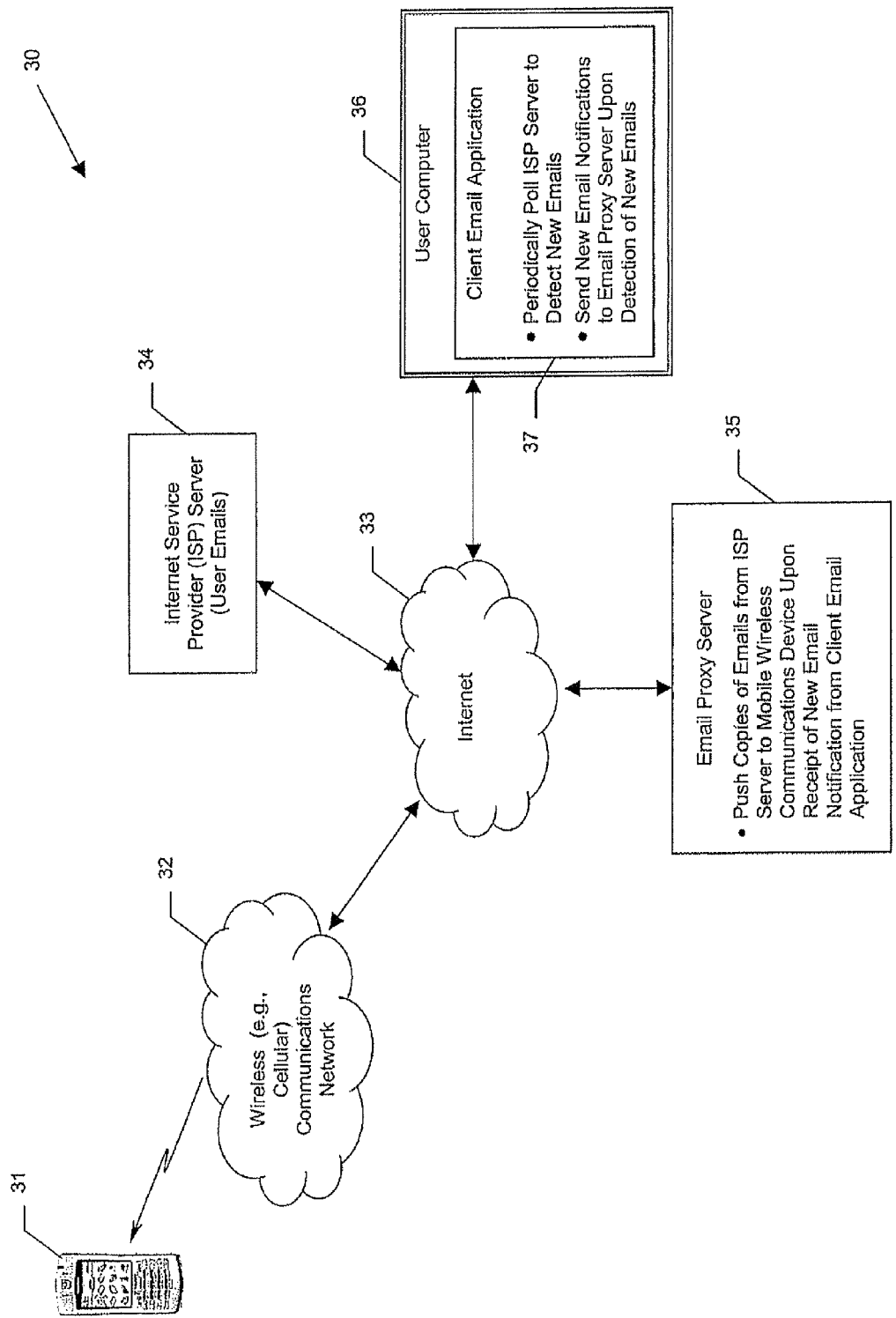
FIG. 1 is a schematic block diagram of an email communications system in accordance with the present invention.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation and multiple prime notation are used to indicate similar elements or steps in alternate embodiments.

Generally speaking, an electronic mail (email) communications system may include at least one mobile wireless communications device, a wireless communications network connected to the Internet, and an Internet Service Provider (ISP) server connected to the Internet for receiving emails for a given user. The system may further include an email proxy server connected to the Internet for pushing emails from the ISP server to the at least one mobile wireless communications device via the wireless communications network. In addition, the system may further include a user computer connected to the Internet and including a client email application for periodically polling the ISP server to detect new emails. The client email application may also send new email notifications to the email proxy server upon detection of new emails to cause the email proxy server to push the new emails to the mobile wireless communications device. This advantageously relieves the workload of the email proxy server, as it need not poll the ISP server for new emails since the client application already does so.

By way of example, each email may have a respective unique identification (UID) associated therewith, and the user computer may poll the ISP for new emails based upon the UIDs. The new email notifications may include the UIDs of the new emails.

Furthermore, the client email application may establish a semi-permanent Hyper Text Transfer Protocol (HTTP) connection with the email proxy server for sending new email notifications. Moreover, the email proxy server may periodically poll the ISP server to detect new emails if the semi-permanent HTTP connection with the client email application is terminated, to thereby provide a fallback so that the given user will continue to have email pushed to the mobile wireless communications device if the semi-permanent connection with the client email application is lost. In particular, the client email application may initiate the semi-permanent connection using an HTTP GET request, and the client email application may also send the new email notifications using an HTTP POST request.

The client email application may further provide an operational status confirmation notification to the email proxy server after a period during which no new email notifications are sent. For example, this may be done so that the email proxy server knows that the client email application is still connected via the semi-permanent HTTP connection and operating properly, and that the lack of communication is simply a result of there being no new email messages at the ISP server. In addition, the client email application period of polling may be user selectable. Also, the wireless communications network may be a cellular communications network, for example.

An email communications method aspect may include installing a client email application on a user computer connected to the Internet, and periodically polling an ISP server connected to the Internet to detect new emails for a given user using the client email application. The method may further include sending new email notifications to an email proxy server using the client email application upon detection of new emails, and pushing copies of the emails from the ISP server to a mobile wireless communications device of the given user via a wireless communications network using the email proxy server.

A computer-readable medium having computer-executable instructions may be for causing a user computer connected to the Internet to perform steps including periodically polling an ISP server connected to the Internet to detect new emails for a given user, and sending new email notifications to an email proxy server upon detection of new emails. This advantageously causes the email proxy server to push copies of the emails from the ISP server to a mobile wireless communications device of the given user via a wireless communications network.

Figure 2:
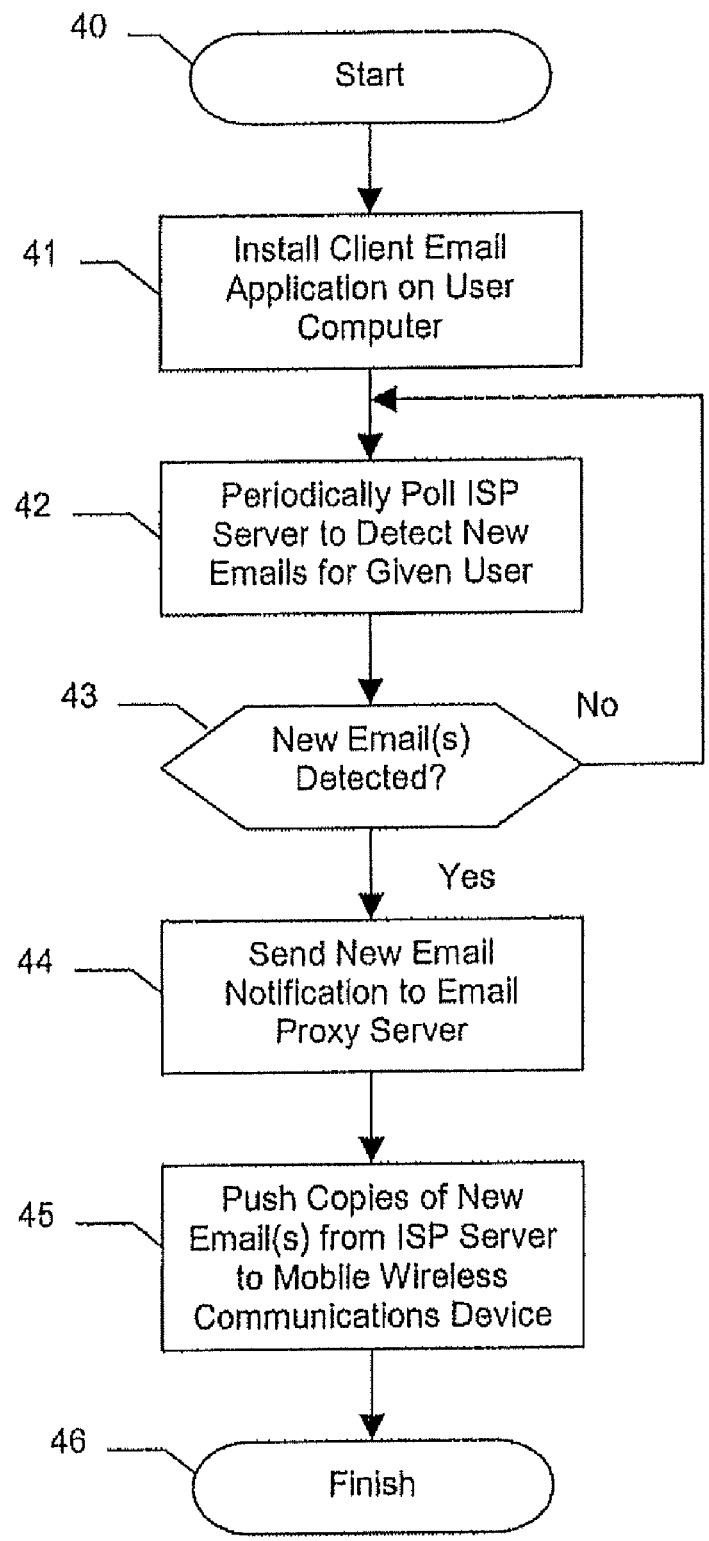
FIG. 2 is a flow diagram of an email communications method in accordance with the present invention.

Referring initially to FIGS. 1 and 2, an email communications system 30 and associated method are now described. The system 30 illustratively includes a mobile wireless communications device 31, a wireless communications network 32 connected to the Internet 33, and an Internet Service Provider (ISP) server 34 connected to the Internet for receiving emails for a given user. By way of example, the mobile wireless communications device 31 may be a cellular device which is capable of sending and receiving emails, and the wireless communications network 32 may be a cellular network, as will be appreciated by those skilled in the art.

Other types of mobile wireless communications devices 31 and mobile wireless communications networks may be used, such as a wireless local area network (WLAN) (e.g., IEEE 802.11x, Bluetooth, etc.). Moreover, it should also be noted that only a single wireless communications device 31, wireless communications network 32, and ISP server 34 are shown in the illustrated example for clarity of reference, but in an actual implementation there may be numerous ISP servers, networks (e.g., cellular carriers networks), mobile devices, and even email proxy servers 35 as well.

The system 30 further illustratively includes an email proxy server 35 connected to the Internet 33 for pushing the emails from the ISP server to the mobile wireless communications device 31 via the wireless communications network 32. By "push" it is meant that the email proxy server 35 sends emails to the mobile wireless communications device 31 without the device having to initiate a check for new emails or send a request to download new emails (such as through an SMS command, for example). Sending emails could include directly sending the stored emails or sending copies thereof. The email proxy server 35 may be an aggregation server that aggregates emails from one or more user email accounts (e.g., GMail, Hotmail, AOL, corporate account, etc.,) to a single convenient target email box (here, the user's mobile wireless communications device 31), as will be appreciated by those skilled in the art.

The system 30 also illustratively includes a user computer 36 connected to the Internet 33 and including a client email application 37. In particular, the user computer 36 could be a stand-alone computer that is connected to the Internet 33 through the user's ISP gateway. In addition, the user computer 36 could also be connected together with other computers in a network, such as in a LAN (e.g., at a corporation), and/or be located in a protected computer environment (e.g., behind a network firewall). The client email application 37 is installed by a user or network administrator, as the case may be, on the user computer (Blocks 40, 41). To this end, the client email application 37 may be implemented with a software module or program installed on the user computer 36, as will be appreciated by those skilled in the art.

Regardless of the location of the user computer 36, by accessing the Internet 33 the client email application 37 advantageously polls the ISP server 34 on a periodic basis to detect new emails for the user, at Block 42. In certain email aggregation systems, the email proxy server 35 is ordinarily responsible for polling the ISP server 34 for new mails for a plurality of different user accounts (in practice there may typically be several ISPs each with numerous user accounts to be polled, as noted above). As a result, the load on the email proxy server (or servers) 35 may become extremely burdensome as the number of system users grows if the period at which the server polls for new email is set too short.

However, in the system 30 the client email application 37, which is installed on the user computer 36, advantageously performs the polling function for the email proxy server 35. That is, the client email application 37 handles polling for new emails for a respective user ISP email account. This advantageously relieves the workload of the email proxy server 35, as it no longer has to poll the ISP server 34 for new emails since the client email application 37 already does so.

Another significant advantage of using the client email application 37 to perform the polling operation is that this may allow the user to set his preferred interval for polling. That is, the user can advantageously set a very short interval for polling for new messages (e.g., every minute or less) if the user requires prompt access to emails. By comparison, the email proxy server 35 may practically only be able to poll at a relatively high interval (e.g., every fifteen minutes) due to the increased load, of polling for numerous users at more frequent intervals. Thus, using the client email application to individually poll for only the user's emails, rather than relying upon the email proxy server 35 (which would perform shared polling for numerous users) gives the user more flexibility in setting his desired polling interval. By way of example, the user may set the polling interval via a graphical user interface (GUI) control window for the client email application software, as will be appreciated by those skilled in the art.

Once the client email application 37 detects that a new email(s) is available on the ISP server 34 for the given user, the client email application sends a new email notification to the email proxy server 35, at Blocks 43 and 44. This advantageously causes the email proxy server 35 to push the new emails to the mobile wireless communications device 31 (Block 45), thus concluding the illustrated method (Block 46).

Figure 3:
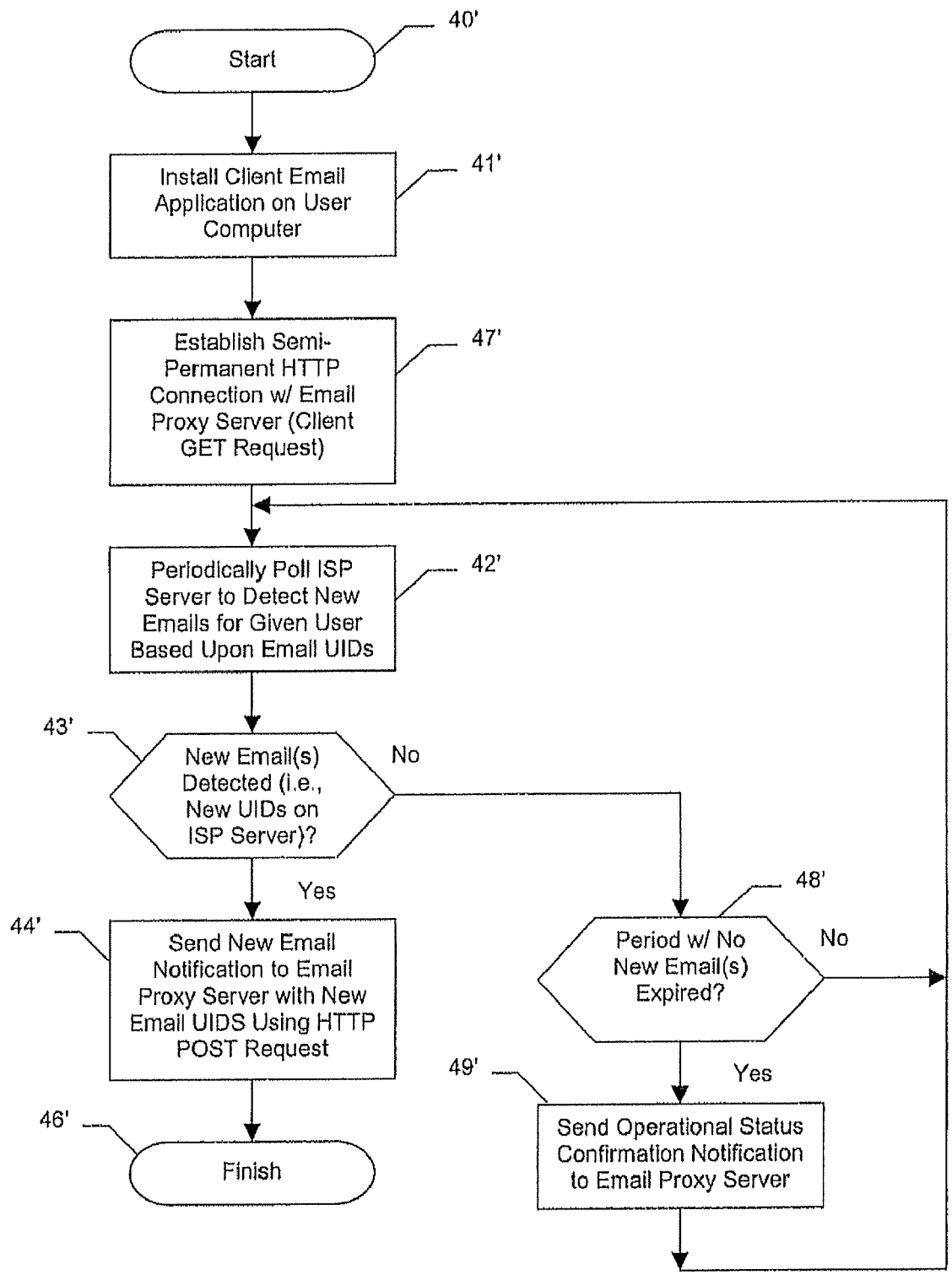
FIGS. 3 and 4 are flow diagrams of an alternative embodiment of the method of FIG. 2 illustrating operational steps relating to the client email application and the email proxy server, respectively.
Figure 4:
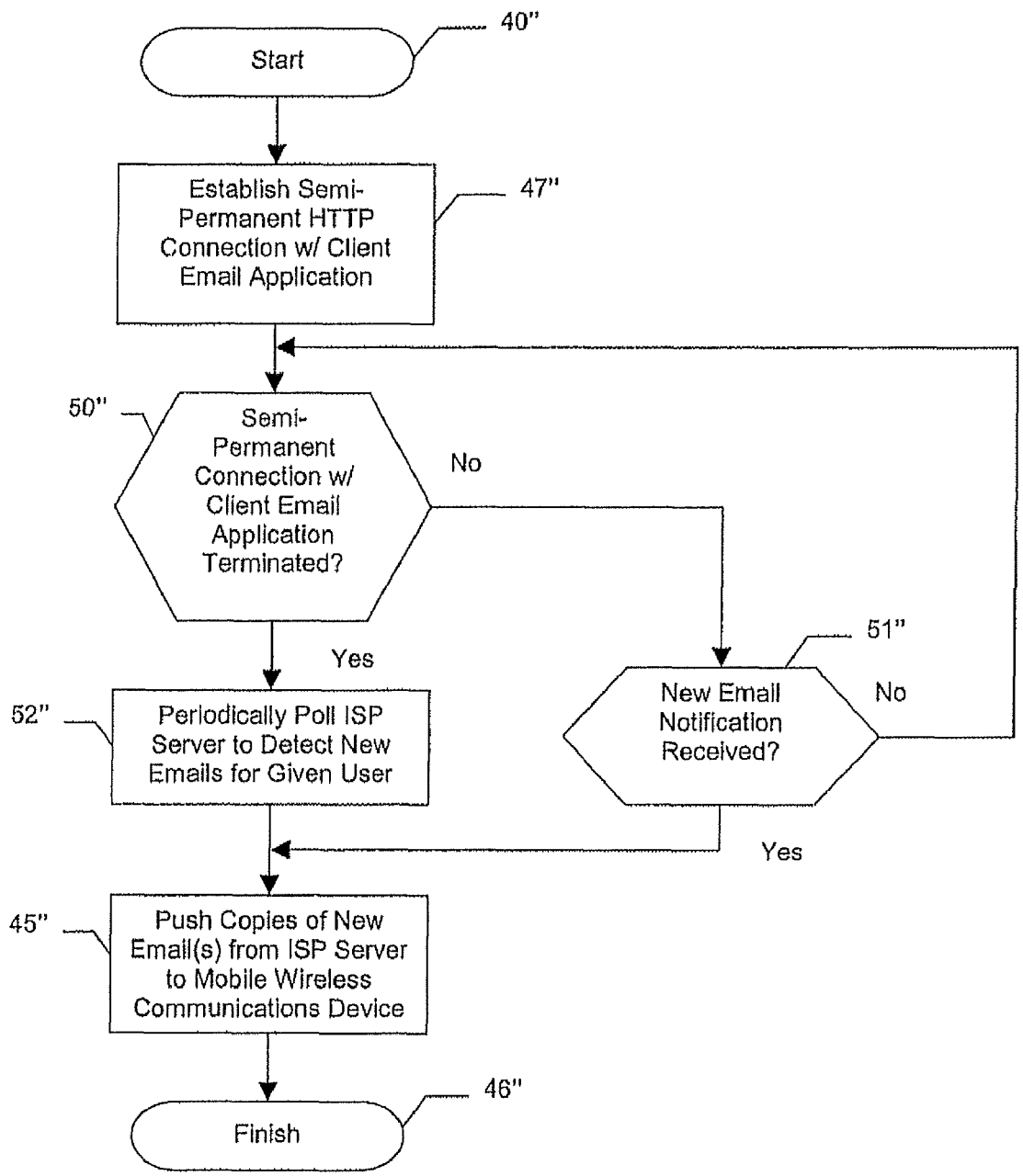

Turning now to FIGS. 3 and 4, additional operational and method aspects of the client email application 37 and email proxy server 35, respectively, are now described. After installation of the client email application 37 on the user computer 36, the client email application 37 is assigned a global unique identifier (GUID), which is also saved in a knowledge base (not shown) for use by the email proxy server 35. The client email application 37 may supply this GUID in communications with the email proxy server 35 for authentication purposes.

In some embodiments, the user may manually initiate a session of the client email application 37 on the user computer 36. For example, the user may run the client email application 37 upon leaving the office for the evening or for an extended period. In other embodiments, the client email application 37 may be implemented as a background program that operates whenever the operating system (OS) (e.g., Windows NT, etc.) of the user computer 36 is running, and is transparent to the user. That is, as long as the OS is running, the client email application 37 will run in the background to automatically begin performing the operations discussed above.

To this end, the client email application 37 opens or initiates a connection to the email proxy server 35, at Block 47', and identifies itself uniquely by supplying the GUID. By way of example, the client email application 37 may initiate the connection by sending an HTTP GET request to the email proxy server 35. The client email application 37 may also provide additional HTTP headers therein, such as data specifying the globally unique identifier (GUID) to the HTTP server 102, for example. The email proxy server 35 may thereby establish with the client email application 37 a semi-permanent connection that is available for the client email application to send new email notifications to the email proxy server.

By establishing the semi-permanent connection, the client email application 37 and the email proxy server 35 may advantageously communicate using standard HTTP requests to avoid being blocked by a firewall or other network security programs. That is, because the client email application 37 and the email proxy server 35 advantageously communicate using HTTP requests, communications therebetween appear as normal HTTP (i.e., Internet) traffic to a firewall program, which typically allows such communications to proceed where other communications (e.g., file transfers, etc.) are otherwise blocked, as will be appreciated by those skilled in the art. Of course, in some embodiments the client email application 37 and the email proxy server 35 need not necessarily establish the semi-permanent HTTP connection and may communicate using other techniques, as will also be appreciated by those skilled in the art.

Each email stored on the ISP server 34 may have a respective unique identification (UID) associated therewith, which may be a number or alphanumeric string, for example. As such, the client email application 37 may poll the ISP server 34 for new emails based upon the UIDs. That is, the client email application 37 may record a list of current email UIDs stored on the ISP server 34 after it polls the ISP server. When the client email application 37 next polls the ISP server 34, it can thus compare a newly received list of emails on the ISP server 34 with the previously stored list, to determine if there are any differences (i.e., any new UIDs that were not present in the previously stored list). If so, the client email application 37 determines that a new email(s) is available, at Blocks 42'-43', and can send the new email notification to the email proxy server 35.

The client email application 37 may format the new email notifications as HTTP POST requests, for example, to send to the email proxy server 35, at Block 44'. This essentially reverses the traditional client-server relationship between the client email application 37 and the email proxy server 35, in that a client application typically only sends HTTP GET requests to a server, and it is the server that responds with HTTP POST requests. In this way, the email proxy server 35 may also advantageously send work jobs to the client email application 37 via an HTTP POST request (responsive to the HTTP GET request used by the client email application to initiate the semi-permanent connection).

By way of example, one work job may be to reconcile a corporate email account inbox with the inbox on the mobile wireless communications device 31 if the user computer is within a corporate network environment. In this way, the client email application 37 may be used not only to poll for emails on one or more of the user's ISP emails accounts, but may also be used to poll for emails on the user's corporate account, and respective new email notifications for each account may be sent to the email proxy server 35. The client email application 37 may also be used to reconcile the user's emails on the ISP server 34, if such functionality is supported by the ISP.

The new email notifications may include the UIDs of the newly located emails in some embodiments, which allows the email proxy server 35 to request from the ISP server 34 the particular new emails that it needs to push to the mobile wireless communications device 31. However, the UIDs need not be included in the new email notifications in all embodiments, and the email proxy server 35 may also use a previously stored list of UIDs to determine which emails stored on the ISP server 34 are new and need to be pushed to the device 31. Of course, other approaches for determining new emails may be used, such as by date (e.g., all emails with a received date/time later than the last check date/time), etc., as will be appreciated by those skilled in the art.

Once the semi-permanent connection between the email proxy server 35 and the client email application 37 is established, the email proxy server monitors the connection to make sure that the client email application is still operational and providing notifications when available. The way in which the email proxy server 35 knows that the client email application 37 is still operational and connected is by (a) receiving a new email notification, or (b) receiving an operational status confirmation notification, as discussed above That is the email proxy server 35 will expect to receive one of these two types of notifications from the client email application 37 within a certain period of time (e,g., 15 minutes), and if it does not it will consider the semi-permanent connection terminated, at Block 50". When a new email notification (or operational status confirmation notification) is received, at Block 51", the email proxy server 35 pushes copies of the new emails to the mobile wireless handheld device 31, at Block 45".

However, if the semi-permanent connection is terminated and the email proxy server 35 and the client email application 37 are no longer able to communicate via the Internet, the email proxy server 35 may advantageously begin periodically polling the ISP server 34 to detect new emails, at Block 52". As such, this advantageously provides a fallback so that the given user will continue to have email pushed to the mobile wireless communications device 31 even though the semi-permanent connection with the client email application 37 is lost.

In accordance with another advantageous aspect, a computer-readable medium may have computer-executable instructions for causing the user computer 36 to perform steps including periodically polling the ISP server 34 to detect new emails for a given user, and sending new email notifications to the email proxy server 35 upon detection of new emails. This advantageously causes the email proxy server 35 to push copies of the new emails from the ISP server to the mobile wireless communications device 31 of the given user via the wireless communications network 32, as discussed further above.

Figure 5:
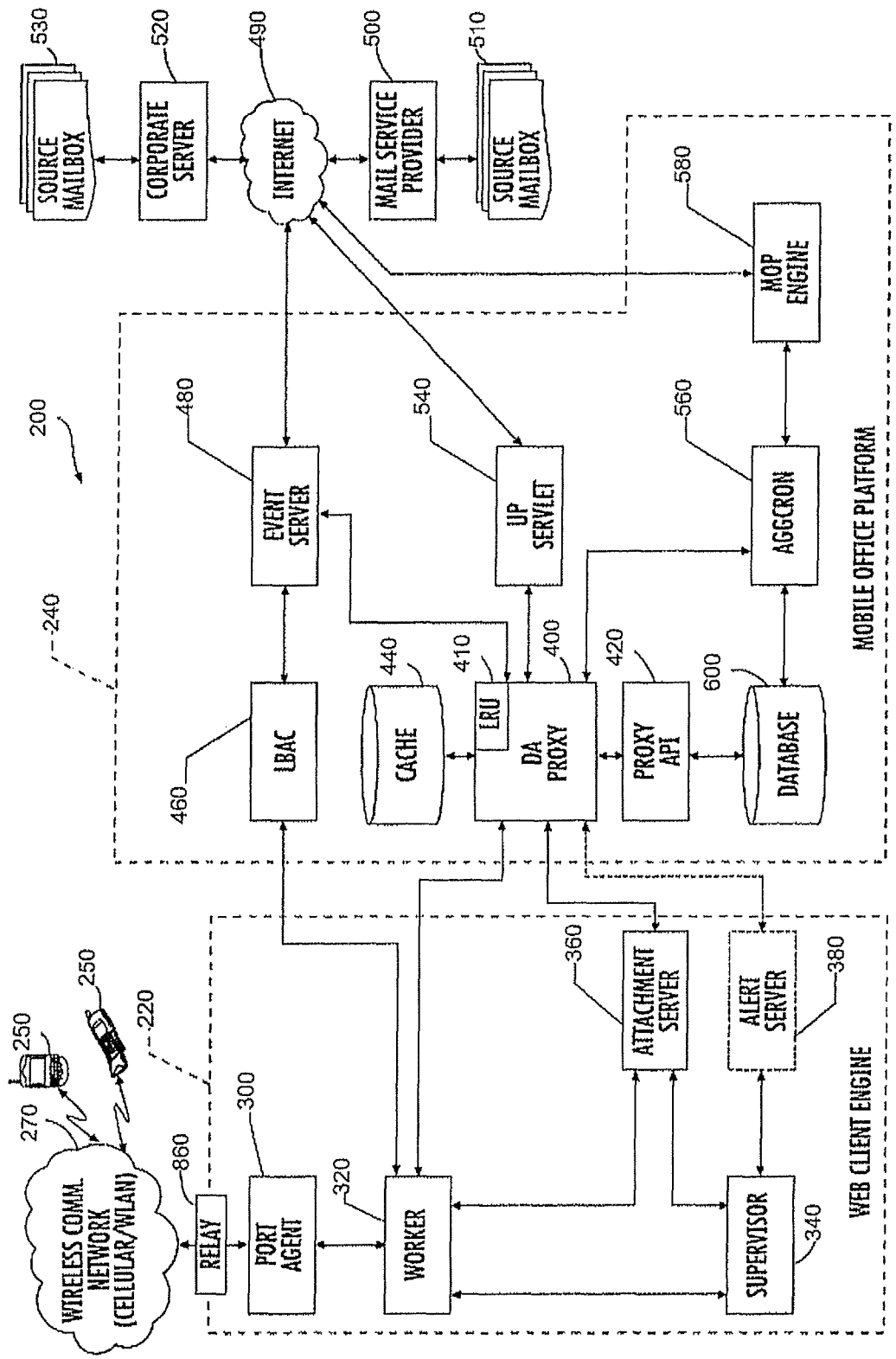
FIG. 5 is schematic block diagram of an exemplary direct access electronic mail (email) distribution and synchronization system that may be used for the email proxy server of FIG. 1.

Referring now to FIG. 5, an exemplary direct access (DA) email distribution and synchronization system 200 is now described which may be used to provide the above-described email proxy server 37 functions. The system 200 allows direct access to different mail sources, allowing messages to be transferred directly to a mobile wireless handheld device from a source mailbox. As a result, different mail stores need not be used for integrated external source mail accounts, and a permanent copy of an email in a local email store is not required.

Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

The direct access system 200 enables email users or subscribers to have email from third-party email services pushed to various mobile wireless communications devices 250. Users need not create a handheld email account to gain direct access to an existing external email account. The direct access system 200 may operate without performing aggregation as used in some prior art systems, in which emails are aggregated from multiple different source mailboxes to a single target mailbox. In other words, email need not be stored in an intermediate target mailbox, but instead may advantageously be accessed directly from a source mail store.

As illustrated in FIG. 5, the direct access system 200 illustratively includes a Web client (WC) engine 220 and a mobile office platform (MOP) 240. These Web client engine 220 and mobile office platform 240 operate together to provide users with direct access to their email from mobile wireless communications devices 250 via one or more wireless communications networks 270, for example. Both the Web client engine 220 and the mobile office platform 240 may be located at the same location or at separate locations, and implemented in one or more servers. The web client engine 220 illustratively includes a port agent 300 for communicating with the wireless communications devices 250 via the wireless communications network(s) 270, a worker 320, a supervisor 340, and an attachment server 360, which will be discussed further below. An alert server 380 is shown in dashed lines, and in one preferred embodiment, is not used, but could be part of the system in yet other embodiments.

The mobile office platform 240 illustratively includes a DA proxy 400, and a proxy application programming interface (API) 420 and a cache 440 cooperating with the DA proxy. The mobile office platform 240 also illustratively includes a load balance and cache (LBAC) module 460, an event server 480, a universal proxy (UP) Servlet 540, an AggCron module 560, a mobile office platform (MOP) engine 580, and a database (DB) engine 600, which will be discussed in further detail below. The Least Recently Used (LRU) cache 410 caches new messages, and can release messages and objects that were least recently used.

The supervisor 340 processes new mail notifications that it receives from the direct access proxy 400. It then assigns a job, in the form of a User Datagram Protocol (UDP) packet, to the least-loaded worker 320, according to the most recent UDP heartbeat the supervisor 340 has received. For purposes of this description, heartbeat is a tool that monitors the state of the server. Additionally, the supervisor 340 will receive a new service book request from the direct access proxy 400 to send service books to the mobile wireless communication device for new or changed accounts. A service book can be a class that could contain all service records currently defined. This class can be used to maintain a collection of information about the device, such as connection information or services, such as an email address of the account.

The worker 320 is an intermediary processing agent between the supervisor 340 and the port agent 300, and responsible for most processing in the Web client engine 220. It will retrieve e-mail from a universal proxy 540, via a direct access proxy, and format e-mail in Compressed Multipurpose Internet Mail Extension (CMIME) as a type of Multipurpose Internet Mail Extension, and send it to the port agent 300, for further processing. Its responsibilities include the following tasks: (1) messages sent to and received from the handheld; (2) message reply, forward and more requests; (3) Over-The-Air Folder Management operation (OTAFM); (4) attachment viewing; and (5) service book.

The port agent 300 acts as a transport layer between the infrastructure and the rest of the Web client engine 220. It is responsible for delivering packets to and from the mobile wireless communications device. To support different integrated mailboxes with one device, more than one service book can be used, and each service book can be associated with one integrated mailbox. A port agent 300 can include one Server Relay Protocol (SRP) connection to a relay, but it can also handle multiple SRP connections, and each connection may have a unique Globally Unique Identifier (GUID) associated with a service book. The attachment server 360 provides service for document/attachment conversion requests from workers 320.

The direct access proxy 400 provides a Web-based Distributed Authoring and Versioning (WebDAV) interface that is used by the worker 320 to access account and mailbox information. This provides functionality to create, change and move documents on a remote server, e.g., a Web server. The direct access proxy 400 typically will present an asynchronous interface to its clients. The LBAC module 460 is used by a notification server and the Web client engine 220 components to locate the proper DA proxy for the handling of a request. The universal proxy Servlet 540 abstracts access to disparate mail stores into a common protocol. The event server 480 responds to notifications of new messages from corporate servers 520 and/or mail service providers 500, which may be received via the Internet 400, for example. The notifications are communicated to the direct access proxy 400 by the AggCron module 560 and the event, server 480 so that it may initiate checking for new mail on source mailboxes 510, 530 of the mail service providers 500 and/or corporate servers 520. The proxy API can be a Simple Object Access Protocol (SOAP) Daemon 420 and is the primary interface with a database 600, which is the primary data store for the mobile office platform 240. The AggCron module 560 may also periodically initiate polling for new messages as well.

The LBAC module 460 is used by a notification server and the Web client engine 220 components to locate the proper DA proxy for the handling of a request. The universal proxy servelet 540 abstracts access to disparate mail stores into a common protocol. The event server 480 responds to notifications of new messages from corporate servers 520 and/or mail service providers 500, which may be received via the Internet 400, for example. The notifications are communicated to the Web client engine 220 by the AggCron module 560 so that it may initiate checking for new mail on source mailboxes 510, 530 of the mail service providers 500 and/or corporate servers 520. The proxy API (SOAP Daemon) 420 is the primary interface with a database 600, which is the primary data store for the mobile office platform 240. The AggCron module 560 may also periodically initiate polling for new messages as well.

Figure 6:
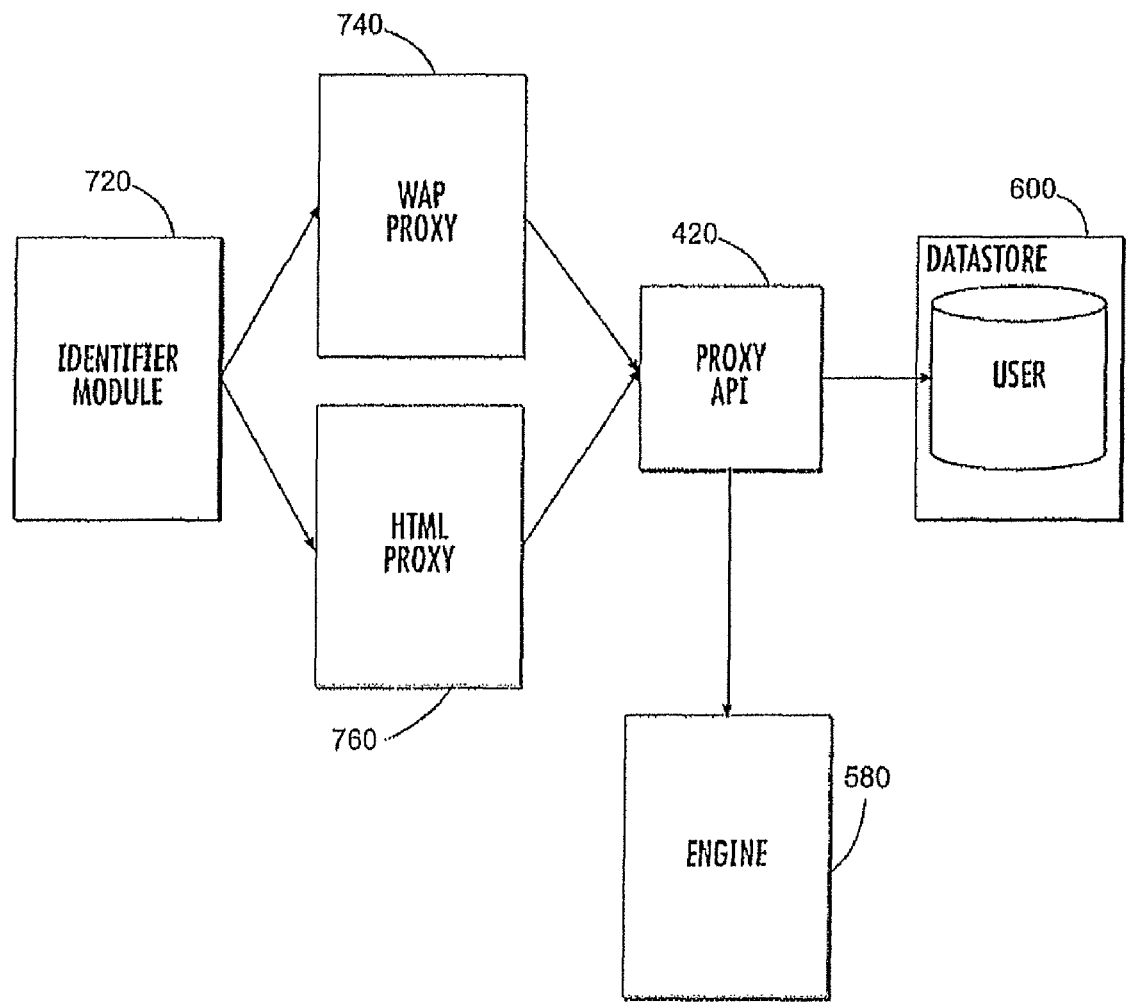
FIG. 6 is a schematic block diagram of an exemplary embodiment of user interface components of the direct access proxy of the system of FIG. 5.

FIG. 6 is a high-level block diagram showing user interface components of the direct access proxy 400. More particularly, the direct access proxy 400 illustratively includes an identifier module 720 with various downstream proxy modules for different communication formats, such as a Wireless Application Protocol (WAP) proxy module 740 and a Hypertext Markup Language (HTML) proxy module 760. Of course, it will be appreciated by those skilled in the art that other types of proxy modules for other communications formats may also be used.

The identifier module 720 provides a centralized authentication service for the direct access system 200 and other services. An authentication handshake may be provided between an ID service and direct access system 200 to ensure that users have the proper credentials before they are allowed access to the direct access system 200. The ability to switch from managing a Web client to a direct access system, or vice versa, may occur without requiring the user to re-enter any login credentials. Any Web client and direct access may share session management information on behalf of a user.

The WAP proxy 740 provides a wireless markup language (WML)-based user interface for configuring source mailboxes with the mobile office platform 240. The HTML proxy 760 provides an HTML-based user interface for configuring of source mailboxes in the MOP 240. The proxy API 420 (SOAP Daemon) is the primary interface with the database 600. The engine 580 is a protocol translator that connects to a source mailbox to validate configuration parameters. The database 600 is the primary user data store for the mobile office platform 240.

Figure 7:
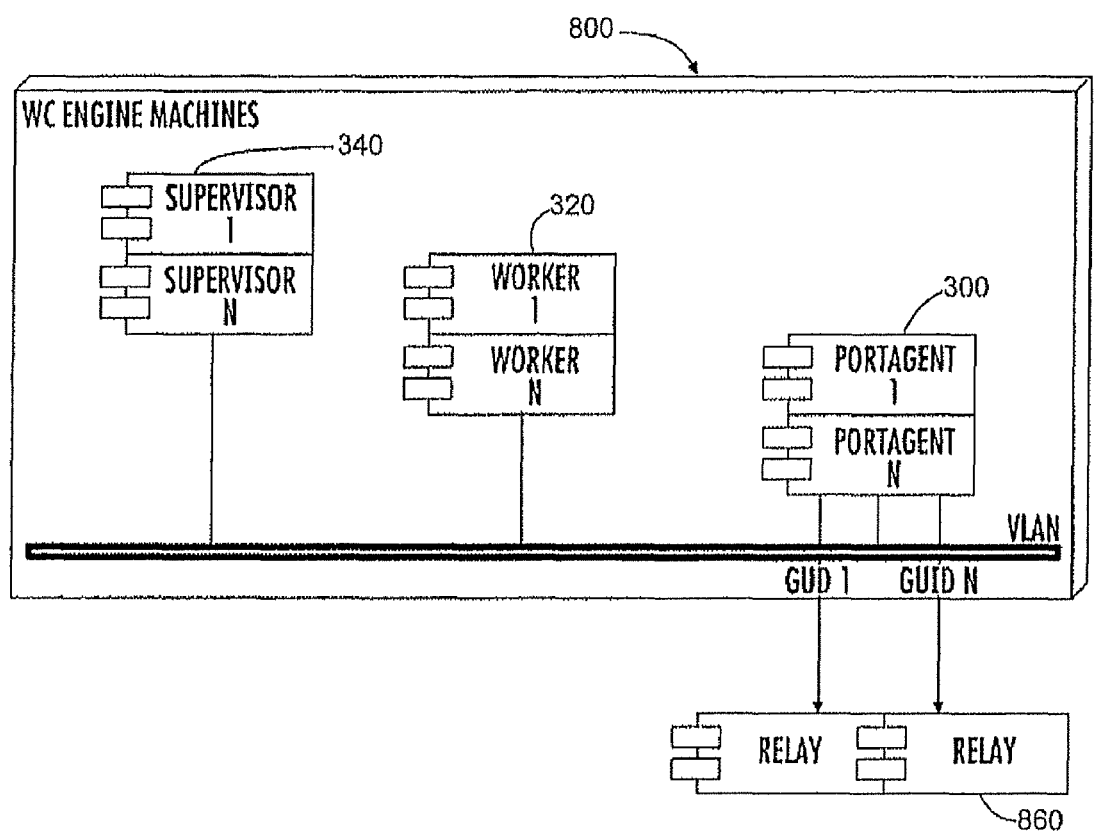
FIG. 7 is a schematic block diagram of an exemplary embodiment of the Web client engine of the system of FIG. 5.
Figure 8:
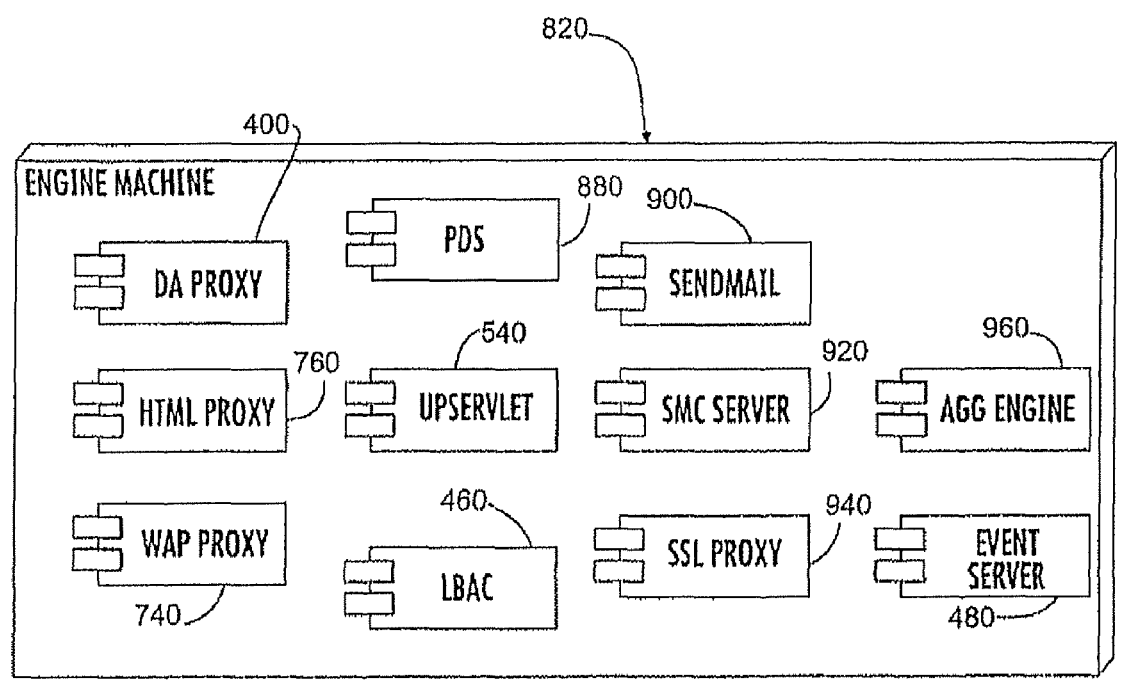
FIG. 8 is a schematic block diagram of an exemplary embodiment of the mobile office platform engine machine for use in the system of FIG. 5.
Figure 9:
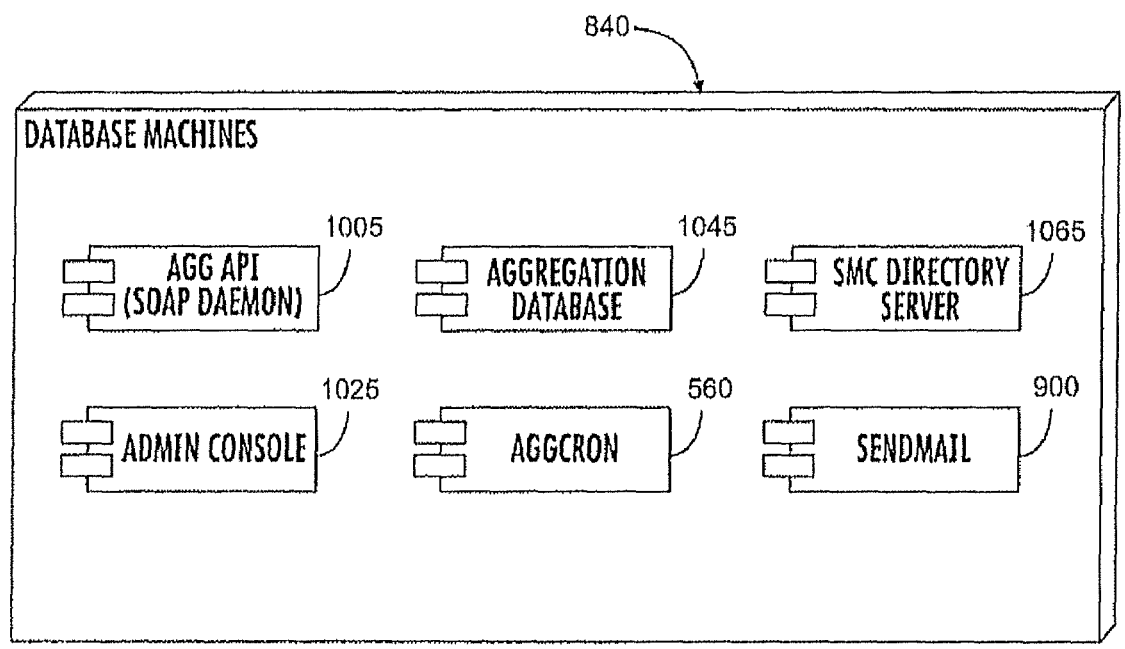
FIG. 9 is a schematic block diagram of an exemplary embodiment of the database module of the system of FIG. 5.

FIGS. 7, 8 and 9 illustrate respective Web client engine machines 800 (FIG. 7), an engine machine 820 (FIG. 8), and database machine 840 (FIG. 9). The Web client engine machine 800 illustratively includes the supervisors 340, workers 360, and port agents 380. Relays 860 cooperate with the port agents 380 using a GUID.

The engine machine 820 illustratively includes a direct access proxy 400, HTML proxy 760, WAP proxy 740, PDS module 880, UP Servlet 540, LBAC module 460, a send-mail module 900, an secure mail client (SMC) server 920, a secure sockets layer (SSL) proxy 940, an aggregation engine 960, and event server 480. The SMC server 920 cooperates with corresponding SMC modules resident on certain corporate networks, for example, to convey email data between the mobile office platform 240 and source mailboxes. The database machine 840 may include an aggregation application programming interface (API) 1005 as a SOAP Daemon, an administration console 1025, an aggregation database 1045, the AggCron module 560, an SMC directory server 1065, and a send mail module 900.

The various components of the Web client engine 220 may be configured to run on different machines or servers. The component binaries and configuration files may either be placed in a directory on the network or placed on a local disk that can be accessed to allow the appropriate components to run from each machine. In accordance with one exemplary implementation, deployment may include one supervisor, two workers, and one port agent for supporting 30,000 external source mailboxes, although other configurations may also be used. Actual production deployment may depend on the results of load, performance and stress testing, as will be appreciated by those skilled in the art.

For the mobile office platform 240 direct access components, modules and various functions, machines are typically installed in two configurations, namely engine machines (FIG. 8) and database machines (FIG. 9). While these machines may have all of the above-described components installed on them, not all of these components need be active in all applications (e.g., aggregation may be used with systems that do not support push technology, etc.). Once again, actual production deployment may depend on the results of load, performance and stress testing.

The mobile office platform 240 architecture in one known technique advantageously uses a set of device/language-specific extensible Stylesheet Language (XSL) files, which transform application data into presentation information. In one non-limiting example, a build process takes a non-localized XSL file and generates a localized XSL file for each supported language. When the XSL file is used, it is "compiled" in memory and cached for repeated use. The purpose of pre-localizing and caching the templates is to reduce the CPU cycles required to generate a presentation page.

Branding may also be performed. Initially, a localized XSL file may build a WAP application to access aggregated email accounts. A WAP proxy application may be localizable and support multiple WAP devices. For each logical page of an application, a device-specific XSL file may be created, which may be localized for each language/country supported. This rendering scheme may support not only WAP devices, but also SMTP, HTML and POP proxies, for example. In branding, each page of a given application may be customized for each different brand.

The branding of a page may be accomplished through XSL file imports, including the use of a Java application programming interface (API) for XML processing (JAXP) feature to resolve the imports dynamically. This need not require that each combined page/brand template be compiled and cached. By way of example, in a sample template directory, first and second pages for a single language/country may be combined with branded counterparts to generate a plurality of distinct template combinations. It is also possible to profile memory requirements of an application by loading templates for a single language, device/application and brand. An HTML device may include a set of templates that are large compared to other devices.

In one known technique, the mobile office platform 240 advantageously builds process and takes non-localized files and language-specific property files and combines them to make each non-localized XSL file into an XSL file for each supported language. A separate XSL file for each language need not be used, and the language factor may be removed from the memory usage equation. A JAXP API may be used to extend XSL file with Java classes. The extensions may take various forms, for example, including extension elements and extension functions. A template may be transformed by creating and initializing an extension object with a locale and passing an object to a transformer. The system can remove multiple imports and use less memory. HTML templates can use template importing to enable template reuse, much like Java classes, and reuse other Java classes through a mechanism like derivation or importing.

In the direct access system 200, users receive email on their mobile wireless communications devices 250 from multiple external accounts, and when replying to a received message, the reply-to and sent-from address integrity is preserved. For example, for a user that has an integrated Yahoo! account (user@yahoo.com) and a POP3 account (user@pop3.com), if they receive an email at user@yahoo.com, their replies generated from the device 250 will appear to come from user@yahoo.com. Similarly, if a user receives an email at user@pop3.com, their replies will appear to come from user@pop3.com.

Selection of the "sent from" address is also available to a user that composes new messages. The user will have the ability to select the "sent from" address when composing a new message. Depending on the source mailbox type and protocol, the message may also be sent through the source mail service. This functionality can be supported by sending a configuration for each source mailbox, for example, as a non-limiting example, a service book for each source mailbox 510, 530 to the mobile wireless communications device 250.

As noted above, a service book is a class that may include all service records currently defined. This class may be used to maintain a collection of information about the device, such as connection information. The service book may be used to manage HTTP connections and mail (CMIME) information such as account and hierachy. At mobile wireless communications devices 250, a delete service book request may be sent when a source mailbox 510, 530 is removed from the account. The service book may also be resent to the device 250 with a viewable name that gives the user some indication that the selection is no longer valid.

A sent items folder may also be "synchronized." Any device-originated sent messages may be propagated to a source account and stored in a sent mail folder, for example. Also, messages deleted on the device 250 may correspondingly be deleted from the source mailbox 510, 530. Another example is that device-originated marking of a message as read or unread on the device 250 may similarly be propagated to the source mailbox 510, 530. While the foregoing features are described as source-dependent and synchronizing one-way, in some embodiments certain synchronization features may in addition, or instead, propagate from the source mailbox/account to the handheld device, as will be appreciated by those skilled in the art.

When available, the mail service provider or corporate mail server may be used for submission of outgoing messages. While this may not be possible for all mail service providers or servers, it is preferrably used when available as it may provide several advantages. For example, subscribers to AOL will get the benefit of AOL-specific features like parental controls. Furthermore, AOL and Yahoo users, as non-limiting examples, will see messages in their sent items folder, and messages routed in this manner may be more compliant with new spam policies such as Sender Policy Framework (SPF) and Sender Id. In addition, messages sent via corporate mail servers 520 will have proper name resolution both at the global address list level and the personal level. It should be understood, however, that the use of the mail service provider 500 to deliver mail may be dependant on partner agreements and/or protocol, depending upon the given implementation.

The architecture described above also advantageously allows for features such as on-demand retrieval of message bodies and attachments and multiple folder support. Moreover, a "this-is-spam" button or indicator may be used allowing company labels and other service provider-specific features when supported by an underlying protocol, as will be appreciated by those skilled in the art.

One particular advantage of the direct access system 200 is that a user need not configure an account before integrating additional accounts. However, a standalone email address may be used, and this address advantageously need not be tied to a mailbox size which the subscriber is required to manage. For example, the email account may be managed by an administrator, and any mail could be purged from the system after a pre-determined period of time (i.e., time-based auto-aging with no mailbox limit for all users).

Additionally, all aspects of any integrated email account creation, settings and options may advantageously be available to the user from their mobile wireless communications device 250 Thus, users need not visit an HTML site and change a setting, create a filter, or perform similar functions, for example. Of course, an HTML site may optionally be used.

As a system Internet email service with the direct access system 200 grows, ongoing emphasis may advantageously be placed on the administrative site to provide additional information to carrier administrators, support teams, and similar functions. However, in some instances a mail connector may be installed on a personal computer, and this functionality may not always be available from the mobile wireless communications device.

The Web client engine 220 may advantageously support different features including message to handheld (MTH), message from handheld (MFH), forward/reply a message, request to view more for a large message (e.g., larger than 2K), request viewing message attachment, and over the air folder management (OTAFM). These functions are explained below.

For an MTH function, each email account integrated for a user is linked with the user device through a Web client service book. For each new message that arrives in the Web client user mailbox, a notification that contains the new message information will typically be sent to a Web client engine supervisor component (FIG. 7), which in turn will assign the job to an available worker with the least load in the system. The chosen worker 320 will validate the user information and retrieve the new message from the user source mailbox and deliver it to the user device.

In an MFH function, MFH messages associated with a Web client service book are processed by the Web client engine 220 and delivered to the Internet 490 by the worker 320 via the simple mail transfer protocol (SMTP) or native outbox. If a user turns on the option to save the sent message to the sent items folder, the direct access proxy will save a copy of the sent message to this folder.

In a Forward/Reply/More function, the user can forward or reply an MTH or MFH message from the mobile wireless communications device 250 as long as the original message still existed in the direct access proxy cache or in user mailbox. For MTH, the worker 320 may send the first 2K, for example, or the whole message (whatever is less) to the user device. If the message is larger than 2K, the user can request MORE to view the next 2K of the message. In this case, the worker 320 will process the More request by retrieving the original message from the user source mailbox, and send back the 2K that the device requests. Of course, in some embodiments more than 2K of message text (or the entire message) may be sent.

In an attachment-viewing function, a user can view a message attachment of a popular document format (e.g., MS Word, MS Power Point, MS Excel, Word Perfect, PDF, text, etc.) or image format (GIF, JPEG, etc). Upon receiving the attachment-viewing request, which is implemented in a form of the More request in this example, the worker 320 can fetch the original message from the user source mailbox via the direct access proxy, extract the requested attachment, process it and send result back to the user device. The processing requires that the original message has not been deleted from the user Web client mailbox.

In the save sent message to sent items folder function, if the user turns this option on, the worker 320 places a copy of each MFH message sent from the user device in the user sent items folder in the mailbox. In over the air folder management, the Web client OTAFM service maintains any messages and folders in the user mailbox synchronized with the user device over the air.

Whenever a message in the user source mailbox is Moved/Deleted, the associated message on the device may also be Moved/Deleted accordingly, and vice-versa. When a message is Moved/Deleted on the device, the associated message in the user Web client mailbox may also be Moved/Deleted accordingly. Similarly, when a folder is Added/Removed/Renamed from the user Web client mailbox, the associated folder on the device may be Added/Removed/Renamed, and vice-versa.

The system 200 may advantageously support different subsets of various messaging features. For example, in the message to handheld function, the mobile office platform 240 may be responsible for connecting to the various source mailboxes 510, 530 to detect new emails. For each new mail, a notification is sent to the Web client engine 220 and, based on this notification, the supervisor 340 chooses one of the workers 320 to process that email. The chosen worker will fetch additional account information and the contents of the mail message from the direct access proxy 400 and deliver it to the user device 250.

In a message sent from handheld function, the MFH could be given to the direct access proxy 400 from the Web client worker 320. In turn, the mobile office platform 240 delivers a message to the Internet 490 by sending through a native outbox or sending it via SMTP. It should be understood, however, that the native outbox, whenever possible, may provide a better user experience, especially when taking into account current anti-spam initiatives such as SPF and sender Id.

In a message deleted from handheld function, when a message is deleted from the device 250, the Web client engine 220 notifies the mobile office platform 240 via the direct access proxy 400. As such, the mobile office platform 240 can delete the same message on the source mailbox.

When handling More/Forward/Reply/Attachment viewing requests, the Web client worker 320 may request an original mail from the direct access proxy 400. It will then process the request and send the results to the mobile wireless communications device 250. The architecture may additionally support on-demand retrieval of message parts and other upgrades, for example.

Upon the integration of a new source mailbox 510, 530, the service book notification from the alert server 380 may be sent to the supervisor 340, which assigns this notification to a worker 320 for sending out a service record to the device. Each source mailbox 510, 530 may be associated with a unique service record. In this way, each MPH message is linked with a source mailbox 510, 530 based on the service record on the device.

The system 200 may also poll the integrated external mailboxes periodically to check for new mail and to access any messages. The system 200 may further incorporate optimizations for polling bandwidth from an aggregation component allowing a quick poll. The system 200 can also advantageously support a large active user base and incorporate a rapidly growing user base.

The topology of load balancing can be based on the size of a component's queue and its throughput. These load statistics can be monitored by a mechanism in one example called the UDP Heartbeat, as described before. If a component is overloaded or has a large queue size, the component will have less chance to get an assigned job from other components. In contrast, a component will get more assigned jobs if it completes more jobs in the last few hours than other components. With this mechanism, the load could distribute over heterogeneous machine hardware, i.e., components running on less power machines will be assigned fewer jobs than those on machines with more power hardware.

General load balancing for any mobile office platform components can be accomplished through the use of a load balancer module, for example, a BIG-IP module produced by F5 Networks of Seattle, Wash. BIG-IP can provide load balancing and intelligent layer 7 switching, and can handle traffic routing from the Internet to any customer interfacing components such as the WAP and HTML proxies. The use of a BIG-IP or similar module may provide the application with pooling capabilities, fault tolerance and session management, as will be appreciated by those skilled in the art.

Typically, access to a single-source mailbox 510, 530 can be from a single direct access proxy 400 over a persistent connection. Any requests on behalf of a particular user could persist to the same machine in the same direct access clustered partition. As certain components are system-wide and will be handling work for users across many partitions, these components can be designed to determine which direct access partition to communicate with on a request-by-request basis.

The load balancer and cache (LBAC) 460 may support this function. The LBAC 460 is a system-wide component that can perform two important functions. The first of these functions is that it provides a mapping from the device PIN to a particular direct access proxy 400, while caching the information in memory for both fast access and to save load on the central database. Secondly, as the direct access proxy 400 will be run in clustered partitions, the LBAC 460 may distribute the load across all direct access proxies within any partition.

The LBAC 460 can be formed of different components. For example, the code which performs the load balancing can be an extended version of a secure mail connector. The code can also perform lookups to the central database and cache the results (LBAC).

In one non-limiting example, when a worker requires that a direct access proxy 400 perform work, it provides the LBAC 460 with a device PIN. The LBAC 460 will discover which partition that PIN is associated with by looking in its cache, or retrieving the partition identifier from a central database (and caching the result). Once the partition is known, the LBAC 460 then consults its cache to see which direct access proxy in that partition has been designated to handle requests for that PIN. If no mapping exists, the LBAC requests the PDS to create a new association on the least loaded DA proxy 400 (again caching the result). Finally, the LBAC 460 responds to the worker 320 with the connection information for the proper direct access proxy to handle that particular request.

The secure mail connector 880 may run in failover pairs, where one is an active master and the other is a secondary standby. Internal data structures may be replicated in real-time from the master to the standby. Multiple LBACs 460 can be run for scalability and fault tolerance, but typically would require an external connection balancing component, such as the BIG-IP component as explained before.

A receiving component in the Web client engine 220 saves the job that has been assigned to it from other components to a job store on the disk before processing. It can update the status of the job and remove the job from the job store when the job processing is completed. In case of component failure or if the process is restarted, it can recover the jobs from the job store and, based on the current statuses of these jobs, continue processing these jobs to the next state, saving the time to reprocess them from the beginning.

Any recovery from the standpoint of MTH/MFH can be achieved through current polling behavior and on the Web client engine 220 recovery mechanisms. From within the mail office platform components, until a message has been successfully delivered to a Web client engine 220, that message is not recorded in the partition database 600. During the next polling interval, the system can again "discover" the message and attempt to notify the Web client engine 220. For new mail events, if an event is lost, the system can pick up that message upon receiving the next event or during the next polling interval. For sources supporting notifications, this interval could be set at six hours, as one non-limiting example. For messages sent from the Web client engine 220, and for messages that have been accepted by the Web client engine, recovery can be handled by different Web client engine components.

The Web client engine 220 may advantageously be horizontally and vertically scalable. Multiple supervisors 340 can be registered/configured with direct access proxies 400 to provide the distribution of the notification load and the availability of engine service. Multiple workers 320 and port agents 300 can run on the same machine or across multiple machines to distribute load and achieve redundancy. As the number of users grows, new components can be added to the system to achieve high horizontal scalability.

It is possible for a new component to be added to or removed from the system automatically without down time. Traffic can automatically be delegated to a new component and diverted away from failed components. Each component within the mobile office platform 240 can be deployed multiple times to achieve horizontal scalability. To achieve vertical scalability, each mobile office platform 240 component can be a multi-threaded process with a configurable number of threads to scale under heavy load. Pools of connections can be used to reduce the overhead of maintaining too many open connections.

One example of a hand-held mobile wireless communications device 1000 that may be used in accordance the system 30 is further described in the example below with reference to FIG. 10. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 10:
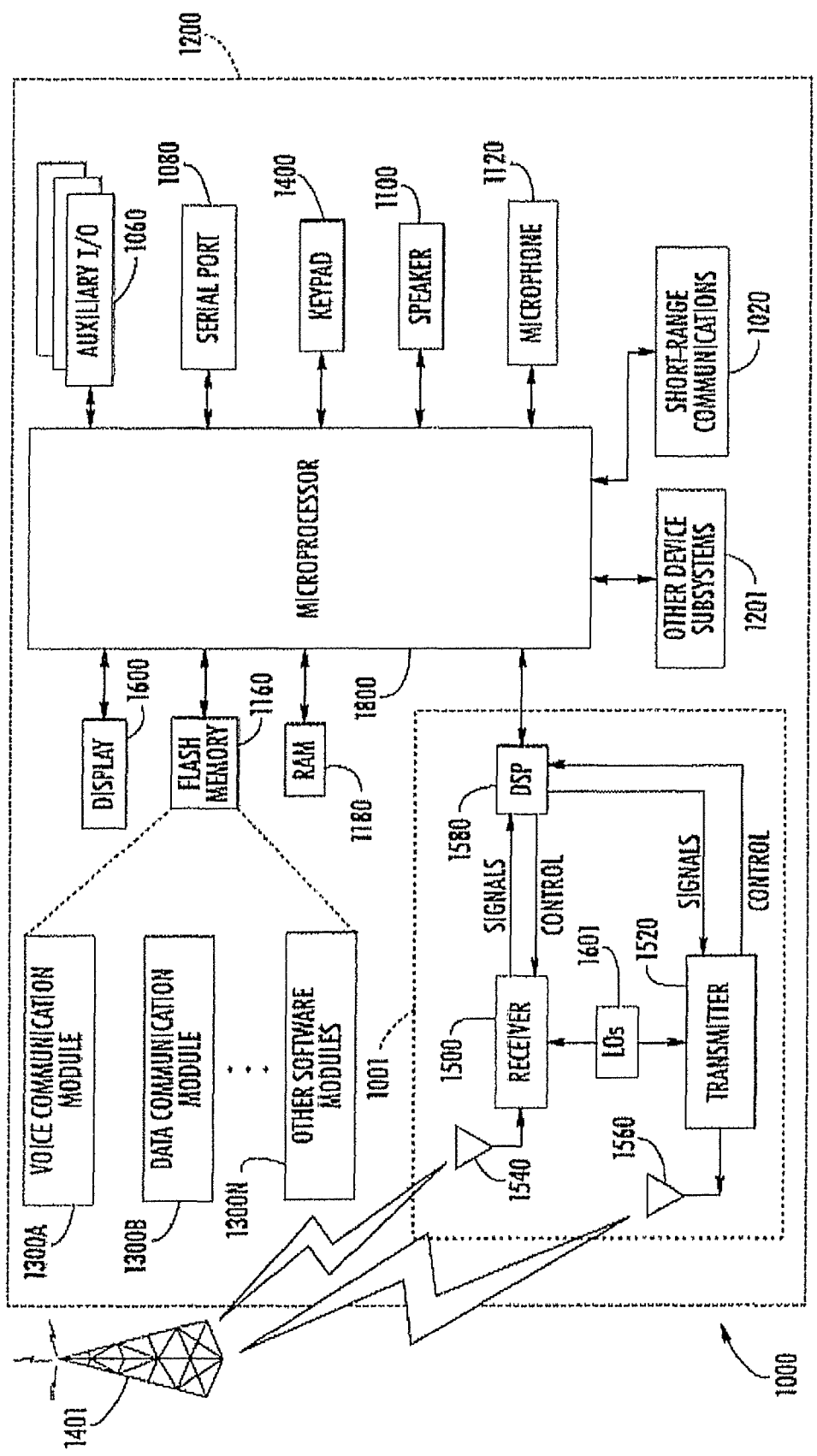
FIG. 10 is a schematic block diagram illustrating exemplary components of a mobile wireless communications device for use with the system of FIG. 1.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet, Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAG™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g., modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic mail (email) system for use with at least one mobile wireless communications device and an Internet Service Provider (ISP) server for receiving emails, the email system comprising:
   an email proxy server configured to push emails from the ISP server to the at least one mobile wireless communications; and
   a computer comprising a client email application configured to poll the ISP server to detect new emails, and to send new email notifications without the new emails to the email proxy server upon detection of new emails to cause said email proxy server to push the new emails to the at least one mobile wireless communications device.

2. The email system of claim 1 wherein said client email application is configured to further provide an operational status confirmation notification to said email proxy server after a period during which no new email notifications are sent.

3. The email system of claim 1 wherein said client email application period of polling is user selectable.

4. The email system of claim 1 wherein said client email application is configured to periodically poll the ISP server.

5. The email system of claim 1 wherein each email has a respective unique identification (UID) associated therewith; and wherein said client email application is configured to poll the ISP server for new emails based upon the UIDs.

6. The email system of claim 5 wherein the new email notifications comprise the UIDs of the new emails.

7. The email system of claim 1 wherein said client email application is configured to establish a semi-permanent Hyper Text Transfer Protocol (HTTP) connection with said email proxy server for sending new email notifications.

8. The email system of claim 7 wherein said client email application is configured to send the new email notifications using an HTTP POST request.

9. The email system of claim 7 wherein said email proxy server is configured to poll the 1SP server to detect new emails if the semi-permanent HTTP connection with said client email application is terminated.

10. The email system of claim 7 wherein said client email application is configured to initiate the semi-permanent connection using an HTTP GET request.

11. The email system of claim 7 wherein said client email application is configured to send the new email notifications using an HTTP POST request.

12. The email system of claim 1 wherein said client email application is configured to further provide an operational status confirmation notification to said email proxy server after a period during which no new email notifications are sent.

13. The email system of claim 1 wherein said client email application period of polling is user selectable.

14. An electronic mail (email) system for use with at least one mobile wireless communications device and an Internet Service Provider (ISP) server for receiving emails, the email system comprising:
   an email proxy server configured to push emails from the ISP server to the at least one mobile wireless communications, each email having a respective unique identification (UID) associated therewith; and
   a computer comprising a client email application configured to
      establish a semi-permanent Hyper Text Transfer Protocol (HTTP) connection with said email proxy server,
      poll the ISP server to detect new emails based upon the UIDs, and send new email notifications without the new emails to the email proxy server upon detection of new emails to cause said email proxy server to push the new emails to the at least one mobile wireless communications device.

15. The email system of claim 14 wherein said client email application is configured to periodically poll the ISP server.

16. The email system of claim 14 wherein said email proxy server is configured to poll the ISP server to detect new emails if the semi-permanent HTTP connection with said client email application is terminated.

17. The email system of claim 14 wherein said client email application is configured to initiate the semi-permanent connection using an HTTP GET request.

18. An electronic mail (email) communications method comprising:

polling an Internet Service Provider (ISP) server connected to detect new emails for a given user a client email application on a computer comprising a processor;

sending new email notifications without the new emails to an email proxy server using the client email application upon detection of new emails; and pushing emails from the ISP server to a mobile wireless communications device of the given user using the email proxy server.

19. The method of claim 18 wherein polling comprises periodically polling.

20. The method of claim 18 wherein each email has a respective unique identification (UID) associated therewith; and wherein polling comprises polling the ISP server for new emails based upon the UIDs.

21. The method of claim 18 further comprising establishing a semi-permanent Hyper Text Transfer Protocol (HTTP) connection between the client email application and the email proxy server.

22. The method of claim 21 further comprising polling the ISP server to detect new emails if the semi-permanent HTTP connection with the client email application is terminated.

23. The method of claim 21 wherein the client email application initiates the semi-permanent connection using an HTTP GET request; and wherein sending comprises sending the new email notifications using an HTTP POST request.

* * * * *

UNITED STATES PATENT AND TRADEMARK OFFICE
CERTIFICATE OF CORRECTION

| | | |
|---|---|---|
| PATENT NO. | : 8,065,363 B2 | Page 1 of 1 |
| APPLICATION NO. | : 12/889464 | |
| DATED | : November 22, 2011 | |
| INVENTOR(S) | : Roberts et al. | |

It is certified that error appears in the above-identified patent and that said Letters Patent is hereby corrected as shown below:

Column 18, Line 38   Delete: "1SP"
                     Insert: --ISP--

Column 19, Line 18   Delete: "a"

Signed and Sealed this
Seventeenth Day of July, 2012

David J. Kappos
*Director of the United States Patent and Trademark Office*